(12) United States Patent
Fannon et al.

(10) Patent No.: US 8,366,059 B2
(45) Date of Patent: Feb. 5, 2013

(54) POSITION CONTROLLED CABLE GUIDE CLIP

(75) Inventors: Joseph P. Fannon, Washington, MI (US); Eugene Ficyk, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 91 days.

(21) Appl. No.: 12/985,406

(22) Filed: Jan. 6, 2011

(65) Prior Publication Data

US 2012/0174349 A1    Jul. 12, 2012

(51) Int. Cl.
*F16L 3/08* (2006.01)
(52) U.S. Cl. ....... 248/74.3; 248/65; 248/74.4; 248/74.2; 403/397; 24/16 PB
(58) Field of Classification Search ............ 248/65, 248/71, 74.1, 73, 74.2, 74.3, 74.4; 403/397; 74/502.4, 135; 24/16 PB
See application file for complete search history.

(56) References Cited

U.S. PATENT DOCUMENTS

| | | | | | |
|---|---|---|---|---|---|
| 4,379,536 | A | * | 4/1983 | Mizuno et al. | 248/73 |
| 4,596,571 | A | * | 6/1986 | Bellotti et al. | 604/411 |
| 4,685,350 | A | * | 8/1987 | Bauer et al. | 74/502.4 |
| 4,723,948 | A | * | 2/1988 | Clark et al. | 604/533 |
| 4,889,006 | A | * | 12/1989 | Kolinske et al. | 74/502.4 |
| 5,531,695 | A | * | 7/1996 | Swisher | 604/111 |
| 5,535,969 | A | * | 7/1996 | Duffy, Jr. | 248/68.1 |
| 5,647,612 | A | * | 7/1997 | Yoshida et al. | 285/13 |
| 6,099,519 | A | * | 8/2000 | Olsen et al. | 604/534 |
| 6,105,216 | A | * | 8/2000 | Opperthauser | 24/459 |
| 6,494,412 | B2 | * | 12/2002 | Gombert | 248/65 |
| 6,561,465 | B2 | * | 5/2003 | Kondo | 248/74.3 |
| 6,962,470 | B2 | * | 11/2005 | Anscher | 411/433 |
| 7,301,101 | B2 | * | 11/2007 | Suzuki | 174/68.1 |
| 7,350,834 | B2 | * | 4/2008 | Ryhman et al. | 285/406 |
| 7,448,579 | B2 | * | 11/2008 | Kwilosz et al. | 248/71 |
| 7,635,355 | B2 | * | 12/2009 | Bierman | 604/174 |
| 7,698,788 | B2 | * | 4/2010 | Hansen et al. | 24/297 |
| 7,887,012 | B2 | * | 2/2011 | Desai et al. | 248/55 |
| 8,020,812 | B2 | * | 9/2011 | Matsuno et al. | 248/71 |
| 8,042,839 | B2 | * | 10/2011 | Rammhofer et al. | 285/215 |
| 8,136,772 | B2 | * | 3/2012 | Kurth | 248/74.3 |
| 8,157,222 | B1 | * | 4/2012 | Shirey et al. | 248/74.1 |
| 2009/0175676 | A1 | * | 7/2009 | Ficyk | 403/123 |

\* cited by examiner

*Primary Examiner* — Terrell McKinnon
*Assistant Examiner* — Daniel J Breslin
(74) *Attorney, Agent, or Firm* — Quinn Law Group, PLLC

(57) ABSTRACT

A clip and cable assembly are configured for attachment to a panel of a vehicle. The cable assembly includes an elongated member. The elongated member includes a radially extending locating feature having a width. The clip includes a housing and a fastener. The housing includes a first section and a second section spaced a distance from the first section and a pocket is defined between the first and second sections. The first and second sections each define a channel that is sized to slidably receive the elongated member of the cable assembly. The pocket receives the locating feature when the elongated member is received in the channel such that movement of clip relative to the elongated member and the locating feature is limited to a length of movement defined as a difference of the distance between the first and second sections and the width of the locating feature.

15 Claims, 2 Drawing Sheets

POSITION CONTROLLED CABLE GUIDE CLIP

TECHNICAL FIELD

The present invention relates to a clip and cable assembly configured for attachment to a panel of a vehicle.

BACKGROUND

A cable may operatively extend between a latch mechanism and an actuator. The cable is typically attached to one or more panels of a vehicle, such as a deck lid panel. The latch mechanism is configured for maintaining the deck lid in a latched or closed state until the deck lid is required to opened, at which time the latch mechanism is unlatched. The actuator is configured to be actuated to move the cable to activate the latch mechanism and operate the latch mechanism to unlatch the deck lid.

SUMMARY

A clip is configured for attaching a cable assembly to a panel of a vehicle. The cable assembly includes an elongated member and a radially extending locating feature having a width, to a panel of a vehicle. The clip includes a housing and a fastener. The housing includes a first section and a second section that is spaced a distance from the first section and a pocket is defined between the first and second sections. The first and second sections each define a channel that is sized to slidably receive the elongated member of the cable assembly. The pocket is configured to receive the locating feature when the elongated member is slidably received in the channel such that movement of clip relative to the elongated member and the locating feature of the cable assembly is limited to a length of movement defined as a difference of the distance between the first and second sections and the width of the locating feature. The fastener operatively extends from the housing and the fastener is configured for attachment to the panel of the vehicle.

A component is configured for attachment to a panel of a vehicle. The component includes a cable assembly and a clip. The cable assembly includes an elongated member that extends along a central axis and presents an exterior surface. The elongated member includes a locating feature having a width and that extends radially from the exterior surface. The clip includes a housing and a fastener. The housing has a first section and a second section spaced a distance from the first section and a pocket is defined between the first and second sections. The first and second sections each define a channel that is sized to slidably receive the elongated member of the cable assembly. The pocket is configured to receive the locating feature when the elongated member is slidably received in the channel such that movement of clip relative to the elongated member and the locating feature of the cable assembly is limited to a length of movement defined as a difference of the distance between the first and second sections and the width of the locating feature. The fastener operatively extends from the housing and the fastener is configured for attachment to the panel of the vehicle.

A vehicle includes a cable assembly, a clip, and a panel. The cable assembly includes an elongated member that extends along a central axis and presents an exterior surface. The elongated member includes a locating feature having a width and that extends radially from the exterior surface. The clip includes a housing and a fastener. The housing includes a first section and a second section that is spaced a distance from the first section and a pocket is defined between the first section and the second section. The first and second sections each define a channel and the elongated member of the cable assembly is slidably received in the channel and the locating feature is received in the pocket such that movement of clip relative to the elongated member and the locating feature of the cable assembly is limited to a length of movement defined as a difference of the distance between the first and second sections and the width of the locating feature. The fastener operatively extends from the housing. The fastener is operatively engaged with the panel of the vehicle.

The above features and advantages and other features and advantages of the present invention are readily apparent from the following detailed description of the best modes for carrying out the invention when taken in connection with the accompanying drawings.

DETAILED DESCRIPTION

Figure 1:
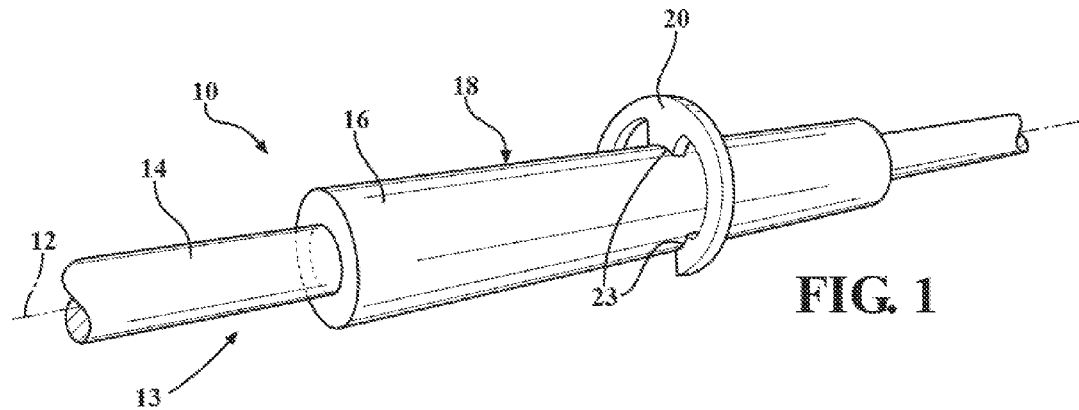
FIG. 1 is a schematic perspective view of a cable assembly.
Figure 2:
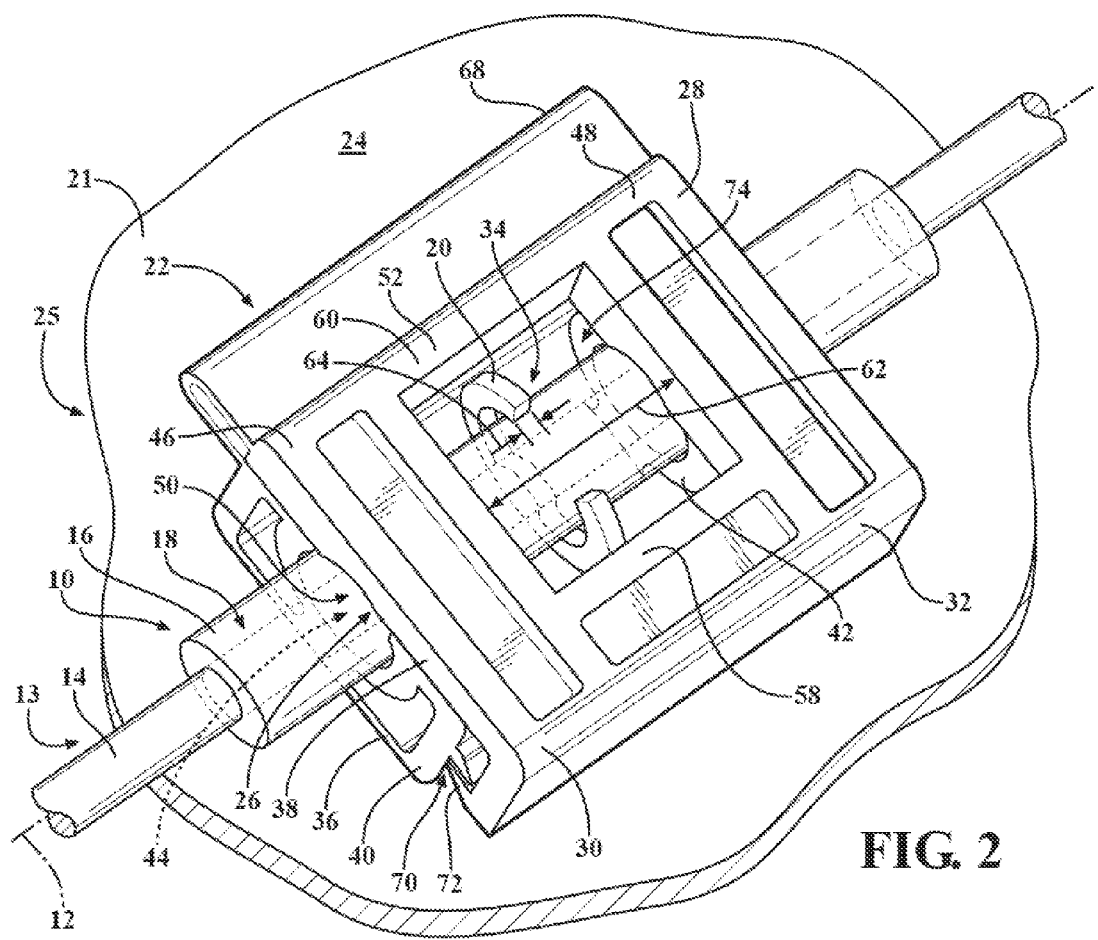
FIG. 2 is a schematic perspective bottom view of the cable assembly assembled to the clip, with the clip attached to the panel of the vehicle.
Figure 3:
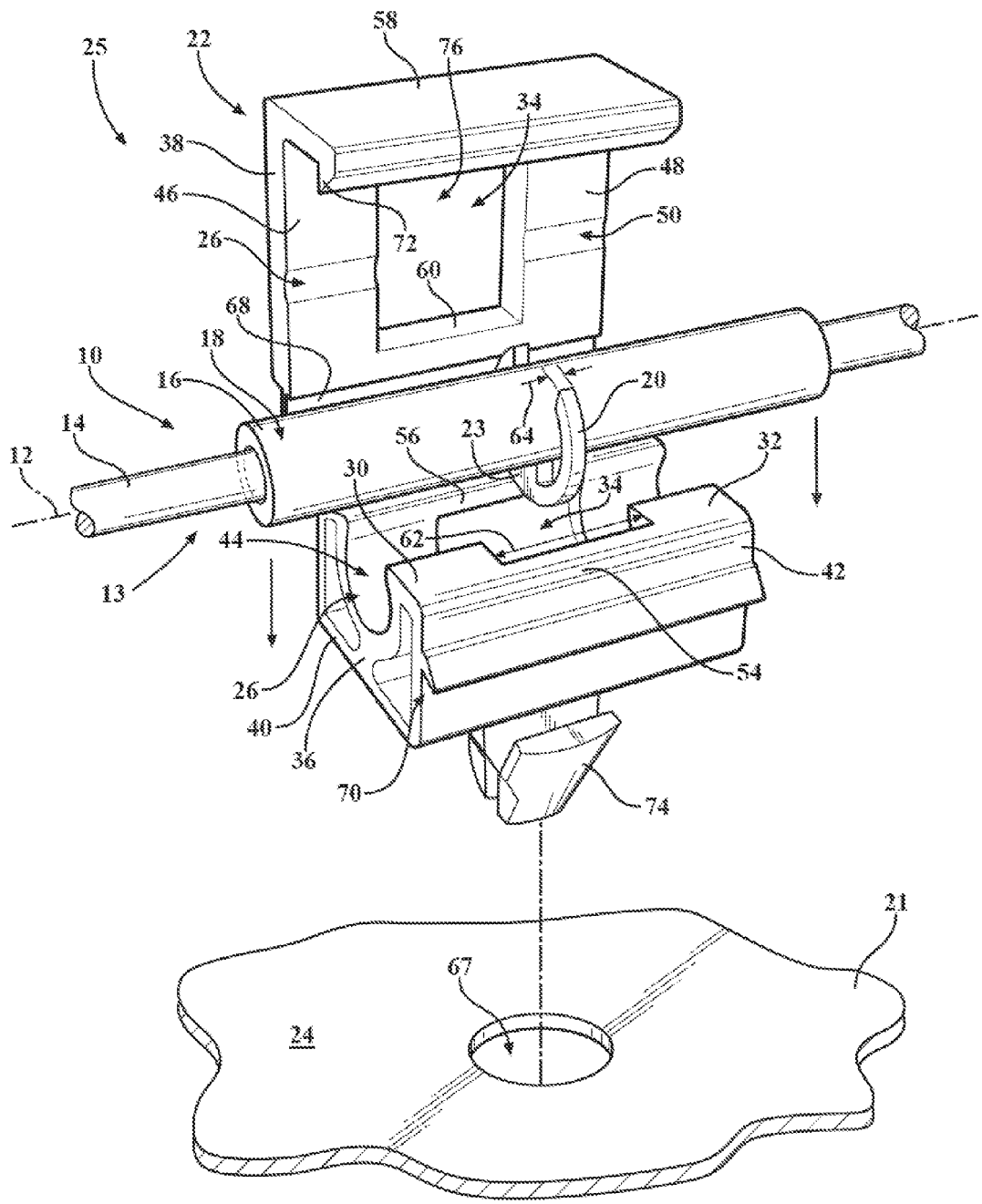
FIG. 3 is a schematic exploded perspective view of the cable assembly of FIG. 1 being inserted into a clip configured for attachment to a panel of a vehicle.

Referring to the drawings, wherein like reference numbers correspond to like or similar components throughout the several figures, FIG. 1 shows a cable assembly 10 configured for attachment to a panel of a vehicle 21 (shown in FIGS. 2 and 3). The cable assembly 10 may be configured for operating a latch (not shown) within the vehicle 21, such as a deck lid latch, a door latch, and the like. It should be appreciated that the cable assembly 10 may be configured for operating any other mechanism within the vehicle 21, as known to those of skill in the art.

The cable assembly 10 extends along a central axis 12 and includes an elongated member 13 that presents an exterior surface 18. A locating feature 20 radially extends from the exterior surface 18 of the elongated member 13. The elongated member 13 may be a conduit 16. The conduit 16 presents the exterior surface 18 and surrounds a cable 14. The cable 14 may be configured to slide along the central axis 12, relative to the conduit 16. The locating feature 20 that extends radially from the exterior surface 18 of the conduit 16. The locating feature 20 may be a generally E-shaped clip 22 or other crimped flange that is configured to engage the exterior surface 18 of the conduit 16 such that movement of the locating feature 20 along the central axis 12, relative to the conduit 16, is prevented. More specifically, the E-shaped clip 22 may include radially inwardly extending tangs 23 and the conduit 16 may be formed from a material having a deformable material. The tangs 23 are configured to be embedded into, or otherwise engage, the exterior surface of the conduit 16 so as to prevent axial movement of the E-shaped clip 22 along the conduit 16. The locating feature 20 may be any other type of locating feature 20 that radially extends from the exterior surface 18 of the conduit 16 and radially extends further than the exterior surface 18 of the conduit 16. It should be appreciated that the elongated member 13 of the cable assembly 10 is not limited to being the conduit 16. More specifically, the elongated member 13 may be configured as the cable 14 such that the cable 14 presents the outer surface 18 and the locating feature 20 radially extends from the exterior surface 18 of the cable 14. In this embodiment, the cable 14 may be any cable or wire, i.e., an electrical wire configured for providing electricity to an electrical component.

A component 25 and a panel 24 of the vehicle 21 are shown in FIG. 2. The component 25 includes the cable assembly 10 and a clip 22. The component 25 is configured to be operatively attached to the panel 24 of the vehicle 21. The clip 22 slidably engages the exterior surface 18 of the cable assembly 10 such that the cable assembly 10 is movable along the central axis 12, relative to the clip 22. The clip 22 is configured for attachment to the panel 24 of the vehicle 21. The cable assembly 10 is configured to be slidably disposed within a channel 26 defined in the clip 22. The panel 24 of the vehicle 21 may be a deck lid panel 24, a door panel 24, and the like. It should be appreciated that while the component only one clip 22 is illustrated in the attached Figures, the component 25 may include any desired number of clips 22 necessary for operatively attaching the cable assembly 10 to the panel 24 of the vehicle 21.

Referring to FIGS. 2 and 3, the clip 22 includes a housing 28 having a first section 30 and a second section 32 spaced a distance 62 from the first section 30. A pocket 34 is defined between the first and second sections 30, 32. The pocket 34 is configured to receive the locating feature 20, as explained in more detail below. The housing 28 includes a base portion 36 and a lid portion 38. The base portion 36 has a first base section 40 and a second base section 42 spaced the distance from the first base section 40. The pocket 34 is at least partially defined between the first base section 20 and the second base section 42. The first base section 40 and the second base section 42 each partially define the channel 26, i.e., a base channel 44, that is sized to at least partially slidably receive the cable assembly 10.

The lid portion 38 is configured for movement relative to the base portion 36 to selectively cover and uncover the base channel 44 of the base portion 36, as shown in FIGS. 2 and 3, respectively. The lid portion 38 has a first lid section 46 and a second lid section 48 that is spaced the distance 62 from the first lid section 46. The first lid section 46 generally corresponds to the first base section 40 and the second lid section 48 generally corresponds to the second base section 42 when the lid portion 38 covers the base channel 44 of the base portion 36. The first lid section 46 and the second lid section 48 each partially define the channel 26, i.e., a lid channel 50, opposing the base channel 44 such that the base channel 44 and the lid channel 50 are sized to cooperate and slidably receive the cable assembly 10 when the lid portion 38 covers the base portion 36. The pocket 34 is at least partially defined between the first lid sections 46 and the second lid section 48.

The housing 28 also includes at least one bridge portion 52 that interconnects the first section 30 and the second section 32. More specifically, the base portion 36 has a first base bridge portion 54 and a second base bridge portion 56 that extends in spaced relationship to the first base bridge portion 54 such that the pocket 34 is at least partially defined between the first base section 40, the second base section 42, the first base bridge portion 54, and the second base bridge portion 56. Likewise, the lid portion 38 has a first lid bridge portion 58 and a second lid bridge portion 60 that extends in spaced relationship to the first lid bridge portion 58 such that the pocket 34 is at least partially defined between the first lid section 46, the second lid section 48, the first lid bridge portion 58, and the second lid bridge portion 60. The first base bridge portion 54 generally corresponds to the first lid bridge portion 58 and the second base bridge portion 56 generally corresponds to the second lid bridge portion 60 when the lid portion 38 covers the base portion 36. Therefore, the pocket 34 is defined between, or otherwise framed by, the first base section 40, the second base section 42, the first lid section 46, the second lid section 48, the first base bridge portion 54, the second base bridge portion 56, the first lid bridge portion 58 and the second lid bridge portion 60 when the lid portion 38 covers the base portion 36.

Referring to FIG. 2, the channel 26 of the clip 22 and the cable assembly 10 may be sized to provide a relatively tight fit relative to one another, while still allowing the cable assembly 10 and the clip 22 to be slidable relative to one another along the central axis 12. Additionally, the locating feature 20 is radially sized to be larger than the channel 26 such that the locating feature 20 will not fit within the channel 26. When the cable assembly 10 is disposed within the channel 26 of the clip 22, the locating feature 20 is captured within the pocket 34 and retained between the first and second sections 30, 32. The first and second sections 30, 32 slidably engage the exterior surface 18 of a portion of the cable assembly 10 such that movement of the cable assembly 10 along the central axis 12, relative to the first and second sections 30, 32, is limited by an interference between the locating feature 20 and each of the first and second sections 30, 32. More specifically, since the locating feature 20 is sized to be radially larger than the channel 26, when the cable assembly 10 is disposed within the channel 26 of the housing 28 of the clip 22, the locating feature 20 is effectively trapped between the first and second sections 30, 32.

Referring again to FIGS. 2 and 3, the first section 30 is spaced the distance 62 from the second section 32. The locating feature 20 has a thickness 64 that is less than the distance 62 defined between the first and second sections 30, 32. Referring specifically to FIG. 2, the cable assembly 10 is configured to move a length of movement along the central axis 12 within the pocket 34, relative to the housing 28 of the clip 22, as defined as a difference of the distance 62 between the first and second sections 30, 32 and the thickness 64 of the locating feature 20. The length of movement of movement of the cable assembly 10 along the central axis 12, relative to the clip 22, allows for alignment of the clip 22 of the cable assembly 10 with a hole 67 defined in the panel 24 of the vehicle 21 during installation.

The housing 28 may also include a hinge 68 that pivotally interconnects the base portion 36 and the lid portion 38. The base portion 36 defines a groove 70 that extends in spaced relationship to the hinge 68. The hinge 68 may be a living hinge 68. It should be appreciated that the hinge 68 may be any type of hinge 68 configured for attaching the lid portion 38 to the base portion 36, as known to those of skill in the art. The lid portion 38 includes a clasp 72 that is disposed in spaced relationship to the hinge 68. The groove 70 is configured to receive the clasp 72 in interlocking relationship to retain the lid portion 38 to the base portion 36 when the lid portion 38 covers the base channel 44 of the base portion 36. Likewise, the clasp 72 is configured to be removed from the groove 70 to move the lid portion 38 to selectively uncover the base channel 44 to facilitate insertion or removal of the cable assembly 10 to/from the base channel 44.

The clip 22 may be formed from a thermoplastic, such as a polyoxymethylene (POM) or acetyl. It should be appreciated, however, that the clip 22 may be formed from any other material, as known to those of skill in the art. In one embodiment, the base portion 36, the lid portion 38, and the hinge 68 are molded as a single piece.

Referring again to FIG. 3, the clip 22 includes a fastener 74 that operatively extends from the housing 28. During installation of the component 24 to the panel 24 of the vehicle 21, the fastener 74 is configured for engagement with the hole 67 defined in the panel 24. The length of movement of the cable assembly 10, relative to the clip 22, as described above, compensates for build variation between the holes 67 defined in the panel 24 and the position of the clip 22 relative to the elongated member 13. The fastener 74 may be a bullet-nosed fastener, a Christmas tree fastener, or any other fastener 74 configured for engaging the hole 67 of the panel 24, as known to those of skill in the art. The fastener 74 may be molded along with the base portion 36, the lid portion 38, and the hinge 68 as a single piece. In another embodiment the fastener 74 is separately attached to the base portion 36 of the clip 22.

The lid portion 38 may also define a window 76 that opens to the pocket 34. The window 76 provides visibility of the locating feature 20 within the pocket 34. The visibility may provide feedback as to the position of the locating feature 20, relative to the first and second sections 30, 32, during installation of the clip 22 and cable assembly 10 to the panel 24.

While the best modes for carrying out the invention have been described in detail, those familiar with the art to which this invention relates will recognize various alternative designs and embodiments for practicing the invention within the scope of the appended claims.

The invention claimed is:

1. A clip configured for attaching a cable assembly, including an elongated member and a radially extending locating feature having a width, to a panel of a vehicle, the clip comprising:
   a housing including a base portion and a lid portion;
   wherein the base portion has a first base section and a second base section spaced a distance from the first base section;
   wherein the lid portion has a first lid section and a second lid section spaced the distance from the first lid section;
   wherein a pocket is at least partially defined between the first and second lid and base sections;
   wherein the first lid section corresponds to the first base section and the second lid section corresponds to the second base section when the lid portion covers the base portion;
   wherein the first and second base sections each define a base channel and the first and second lid sections each define a lid channel opposing the base channel;
   wherein the combination of the base channel and the lid channel are sized to slidably receive the elongated member of the cable assembly when the lid portion covers the base portion;
   wherein the pocket is configured to receive the locating feature when the elongated member is slidably received in the channel such that movement of the clip relative to the elongated member and the locating feature of the cable assembly is limited to a length of movement defined as a difference of the distance between the first and second lid and base sections and the width of the locating feature; and
   a fastener operatively extending from the housing;
   wherein the fastener is configured for attachment to the panel of the vehicle.

2. A clip, as set forth in claim 1, the base portion further including a first base bridge portion and a second base bridge portion in spaced relationship to the first base bridge portion and the lid portion further including a first lid bridge portion and a second lid bridge portion in spaced relationship to the first lid bridge portion such that the pocket is defined between the first base section, the second base section, the first lid section, the second lid section, the first base bridge portion, the second base bridge portion, the first lid bridge portion, and the second lid bridge portion when the lid portion covers the base portion.

3. A clip, as set forth in claim 2, wherein the lid portion is configured for movement relative to the base portion to selectively cover and uncover the base channel of the base portion.

4. A clip, as set forth in claim 3, wherein the housing further includes a hinge interconnecting the base portion and the lid portion.

5. A clip, as set forth in claim 4, wherein the base portion defines a groove in spaced relationship to the hinge and the lid portion includes a clasp disposed in spaced relationship to the hinge; and
   wherein the groove is configured for receiving the clasp in interlocking relationship to one another when the lid portion covers the base channel of the base portion to selectively retain the lid portion to the base portion.

6. A clip, as set forth in claim 4, wherein the hinge is a living hinge.

7. A clip, as set forth in claim 3, wherein the base portion, lid portion, and the hinge are molded as a single piece.

8. A clip, as set forth in claim 1, wherein the fastener is a bullet-nosed fastener.

9. A component configured for attachment to a panel of a vehicle, the component comprising:
   a cable assembly having an elongated member extending along a central axis and presenting an exterior surface;
   wherein the elongated member includes a locating feature having a width and extending radially from the exterior surface; and
   a clip having a housing including a base portion and a lid portion;
   wherein the base portion has a first base section and a second base section spaced a distance from the first base section;
   wherein the lid portion has a first lid section and a second lid section spaced the distance from the first lid section;
   wherein a pocket is at least partially defined between the first and second lid and base sections;
   wherein the first lid section corresponds to the first base section and the second lid section corresponds to the second base section when the lid portion covers the base portion;
   wherein the first and second base sections each define a base channel and the first and second lid sections each define a lid channel opposing the base channel;
   wherein the combination of the base channel and the lid channel are sized to slidably receive the elongated member of the cable assembly when the lid portion covers the base portion;
   wherein the pocket is configured to receive the locating feature when the elongated member is slidably received in the channel such that movement of the clip relative to the elongated member and the locating feature of the cable assembly is limited to a length of movement defined as a difference of the distance between the first and second lid and base sections and the width of the locating feature; and
   a fastener operatively extending from the housing;
   wherein the fastener is configured for attachment to the panel of the vehicle.

10. A component, as set forth in claim 9, wherein the base portion further includes a first base bridge portion and a second base bridge portion in spaced relationship to the first base bridge portion and the lid portion further including a first lid bridge portion and a second lid bridge portion in spaced relationship to the first lid bridge portion such that the pocket is defined between the first base section, the second base section, the first lid section, the second lid section, the first base bridge portion, the second base bridge portion, the first lid bridge portion, and the second lid bridge portion when the lid portion covers the base portion.

11. A component, as set forth in claim 10, wherein the lid portion is configured for movement relative to the base portion to selectively cover and uncover the base channel of the base portion.

12. A component, as set forth in claim 11, wherein the housing further includes a hinge interconnecting the base portion and the lid portion.

13. A component, as set forth in claim 9, wherein the elongated member of the cable assembly is a conduit and the conduit surrounds a cable about the central axis such that the cable is slidable along the central axis, relative to the conduit.

14. A vehicle comprising:
   a cable assembly including:
     an elongated member extending along a central axis and presenting an exterior surface;
     wherein the elongated member includes a locating feature having a width and extending radially from the exterior surface;
   a clip including:
     a housing having a base portion and a lid portion;
     wherein the base portion has a first base section and a second base section spaced a distance from the first base section;
     wherein the lid portion has a first lid section and a second lid section spaced the distance from the first lid section;
     wherein a pocket is at least partially defined between the first and second lid and base sections;
     wherein the first lid section corresponds to the first base section and the second lid section corresponds to the second base section when the lid portion covers the base portion;
     wherein the first and second base sections each define a base channel and the first and second lid sections each define a lid channel opposing the base channel;
     wherein the combination of the base channel and the lid channel are sized to slidably receive the elongated member of the cable assembly, and the locating feature is received in the pocket such that movement of the clip relative to the elongated member and the locating feature of the cable assembly is limited to a length of movement defined as a difference of the distance between the first and second lid and base sections and the width of the locating feature; and
     a fastener operatively extending from the housing; and
   a panel;
   wherein the fastener is operatively engaged with the panel of the vehicle.

15. A vehicle, as set forth in claim 14, wherein the elongated member of the cable assembly is a conduit and the conduit surrounds a cable about the central axis such that the cable is slidable along the central axis, relative to the conduit.

* * * * *